(12) United States Patent
Nakamura et al.

(10) Patent No.: US 10,336,338 B2
(45) Date of Patent: Jul. 2, 2019

(54) WORK VEHICLE

(71) Applicant: KCM Corporation, Kako-gun, Hyogo (JP)

(72) Inventors: Atsushi Nakamura, Kakogawa (JP); Keisuke Naitou, Akashi (JP)

(73) Assignee: KCM Corporation, Hyogo (JP)

( * ) Notice: Subject to any disclaimer, the term of this patent is extended or adjusted under 35 U.S.C. 154(b) by 320 days.

(21) Appl. No.: 15/450,348

(22) Filed: Mar. 6, 2017

(65) Prior Publication Data

US 2018/0086345 A1 Mar. 29, 2018

(30) Foreign Application Priority Data

Sep. 27, 2016 (JP) ................................ 2016-188403

(51) Int. Cl.
*B60W 30/194* (2012.01)
*B60W 10/02* (2006.01)
(Continued)

(52) U.S. Cl.
CPC ........ *B60W 30/194* (2013.01); *B60W 10/026* (2013.01); *B60W 10/06* (2013.01); *E02F 3/34* (2013.01); *E02F 9/22* (2013.01); *E02F 9/2217* (2013.01); *E02F 9/2225* (2013.01); *F16H 45/02* (2013.01); *F16H 61/143* (2013.01); *B60W 2510/0676* (2013.01);
(Continued)

(58) Field of Classification Search
CPC ............. B60W 30/194; B60W 10/026; B60W 2550/12; B60W 2510/0676; B60W 2710/024; F16H 61/143; F16H 2312/20; F16H 61/14
See application file for complete search history.

(56) References Cited

U.S. PATENT DOCUMENTS 7,604,567 B2 * 10/2009 Sasakura ............. B60W 30/194
477/70
2014/0094340 A1 * 4/2014 Yoshikawa ........... B60W 20/10
477/5

FOREIGN PATENT DOCUMENTS

JP          8-23389 B2    3/1996
JP       2008-150965 A    7/2008
WO    WO 2012/105016 A1   8/2012

OTHER PUBLICATIONS

Korean-language Office Action issued in Korean Application No. 10-2017-0027640 dated Jul. 11, 2018 (five pages).

* cited by examiner

*Primary Examiner* — Sherry L Estremsky
(74) *Attorney, Agent, or Firm* — Crowell & Moring LLP

(57) ABSTRACT

A work vehicle has a hydraulic source; a control valve that controls a flow of the hydraulic oil discharged from the hydraulic source; and an engine starting device for starting an engine, in which a control device has: a low-temperature state determination unit that determines whether a temperature state of a working fluid of a torque converter is a low-temperature state; and a clutch control unit that when it is determined by the low-temperature state determination unit that the temperature state of the working fluid is not the low-temperature state, controls the control valve in order to switch a lock-up clutch to a non-engagement state, and when it is determined by the low-temperature state determination unit that the temperature state of the working fluid is the low-temperature state, controls the control valve in order to switch the lock-up clutch to a engagement state.

8 Claims, 9 Drawing Sheets

(51) Int. Cl.
*B60W 10/06* (2006.01)
*E02F 3/34* (2006.01)
*E02F 9/22* (2006.01)
*F16H 45/02* (2006.01)
*F16H 61/14* (2006.01)
*F16H 59/72* (2006.01)
*F16H 59/36* (2006.01)

(52) U.S. Cl.
CPC ... *B60W 2510/107* (2013.01); *B60W 2550/12* (2013.01); *B60W 2710/024* (2013.01); *B60Y 2200/415* (2013.01); *F16H 59/72* (2013.01); *F16H 2059/366* (2013.01); *F16H 2312/20* (2013.01)

WORK VEHICLE

BACKGROUND

1. Field of the Invention

The present invention relates to a work vehicle.

2. Description of the Related Art

A work vehicle having a torque converter for transmitting engine power to wheels (driving wheels) through fluid is known (refer to International publication 2012/105016). The work vehicle such as disclosed in International publication 2012/105016 includes a lock-up clutch for performing mechanical direct linking between input/output members of the torque converter (hydraulic power transmission device).

In the case where an engine is made to start when a working fluid temperature of a torque converter is low and its viscosity is high, if a lock-up clutch is in a non-engagement state, the working fluid of high viscosity in the torque converter will be stirred. As a result, a load of the engine becomes large resulting from resistance of a flow of the working fluid of the torque converter, and therefore there is a possibility that engine startability declines, such as that a time is required in starting the engine, and that the engine cannot be started.

SUMMARY

A work vehicle according to one mode of the present invention has a working device with a working tool and a lift arm, wheels, the engine as a driving source, the torque converter for transmitting power of the engine to the wheels through the working fluid, the lock-up clutch capable of switching an input member and an output member of the torque converter between an engagement state and the non-engagement state, a power supply unit for supplying electric power to a control device, and an indicating device for directing activation of the power supply unit and starting of the engine, in which the working vehicle includes a hydraulic source, a control valve that controls a flow of hydraulic oil discharged from the hydraulic source, and switches the lock-up clutch to either of the engagement state and the non-engagement state, and an engine starter device for starting the engine when starting of the engine is directed by the indicating device, and is characterized that the control device has: a low-temperature state determination unit for determining whether a temperature state of the working fluid of the torque converter is the low-temperature state when the activation of the power source unit is directed by the indicating device and the power supply unit is activated; and a clutch control unit that when it is determined by the low-temperature state determination unit that the temperature state of the working fluid is not the low-temperature state, controls the control valve in order to switch the lock-up clutch to the non-engagement state, and that when it is determined by the low-temperature state determination unit that the temperature state of the working fluid is the low temperature state, controls the control valve in order to switch the lock-up clutch to the engagement state.

According to one aspect of the present invention, the engine startability can be improved.

BRIEF DESCRIPTION OF THE DRAWINGS

Non-limiting and non-exhaustive embodiments of the present embodiments are described with reference to the following figures, wherein like reference signs refer to like parts throughout the various views unless otherwise specified.

DETAILED DESCRIPTION

Figure 1:
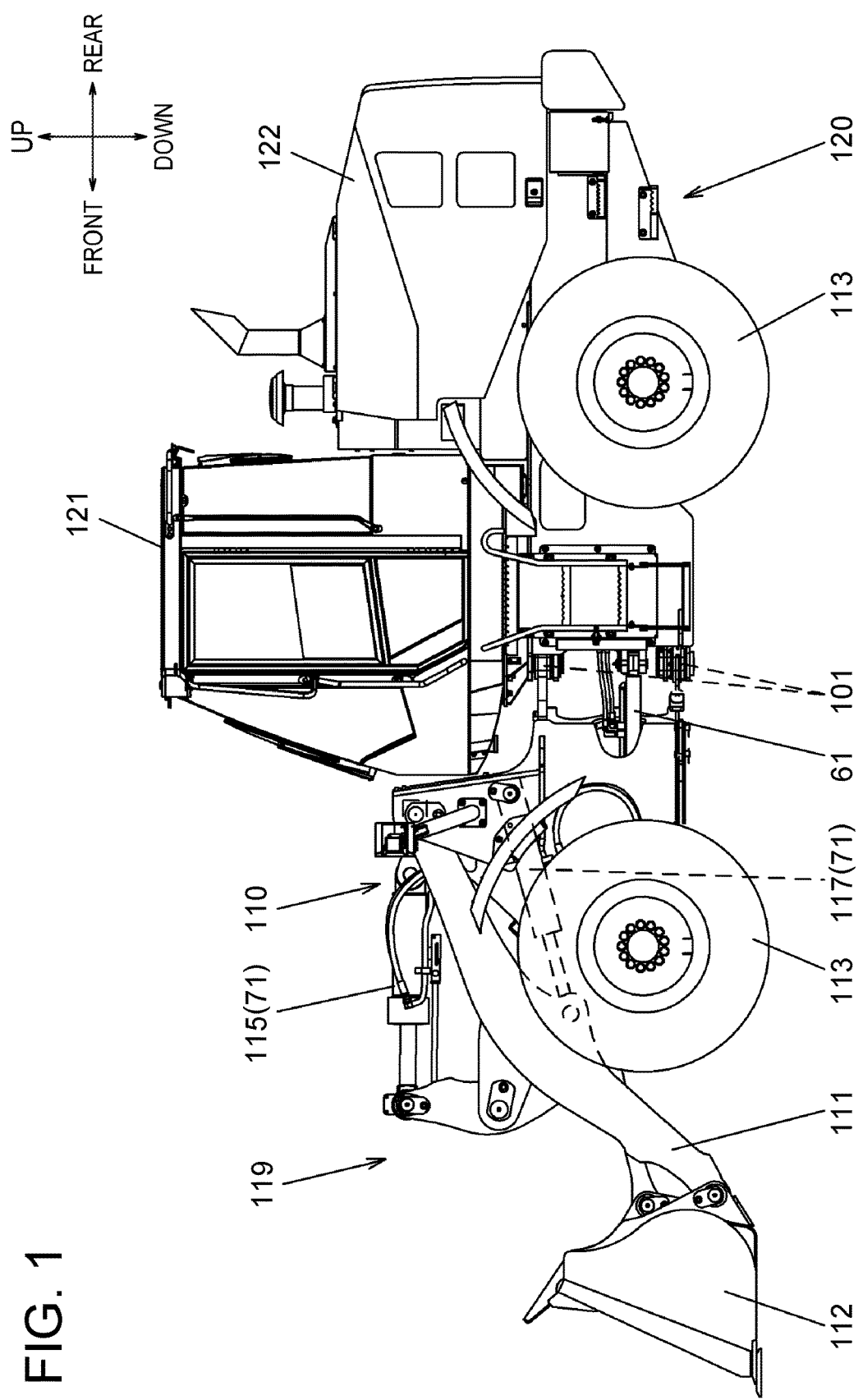
FIG. 1 is a side view of a wheel loader.

Hereinafter, with reference to drawings, one embodiment of a work vehicle according to the present invention is explained. FIG. 1 is a side view of a wheel loader. The wheel loader is configured with a front vehicle body 110 that has a lift arm (hereinafter, simply called as an arm) 111, a bucket 112, front-side wheels 113, etc. and a rear vehicle body 120 that has a cab 121, an engine compartment 122, rear-side wheels, etc.

The arm 111 is attached to the front vehicle body 110 being rotatable in an up and down direction, and is driven to rotate by driving of an arm cylinder 117. The bucket 112 is attached being rotatable in a forward and backward tilting direction (up and down direction) to the arm 111 at a tip of the arm 111, and is driven to rotate by driving of a bucket cylinder 115. The front vehicle body 110 and the rear vehicle body 120 are coupled to each other by a center pin 101 being mutually rotatable, and the front vehicle body 110 is bent to the right and the left with respect to the rear vehicle body 120 by expansion and contraction of a steering cylinder 61.

Figure 2:
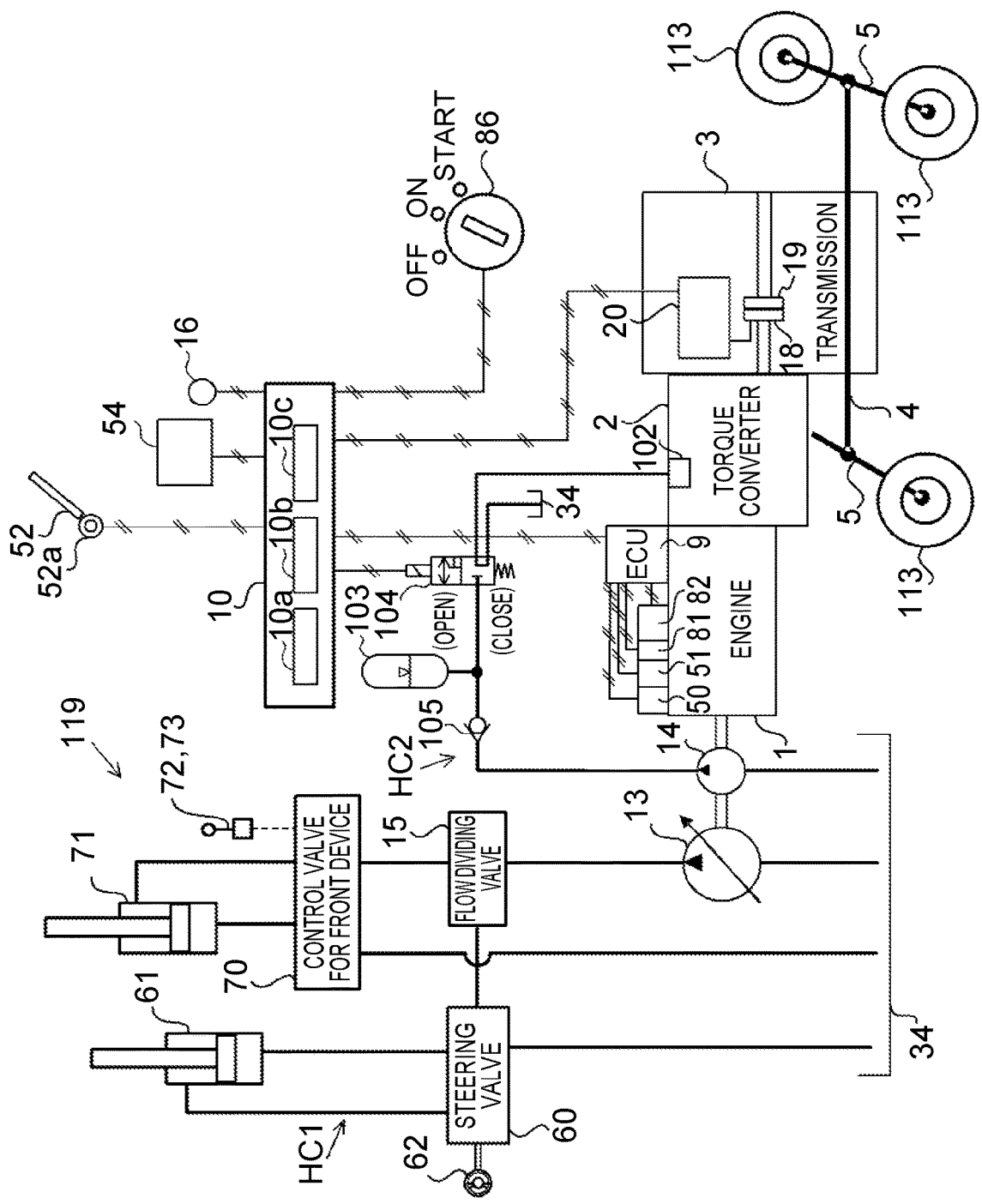
FIG. 2 is a diagram showing a schematic block of the wheel loader according to a first embodiment of the present invention.
Figure 3:
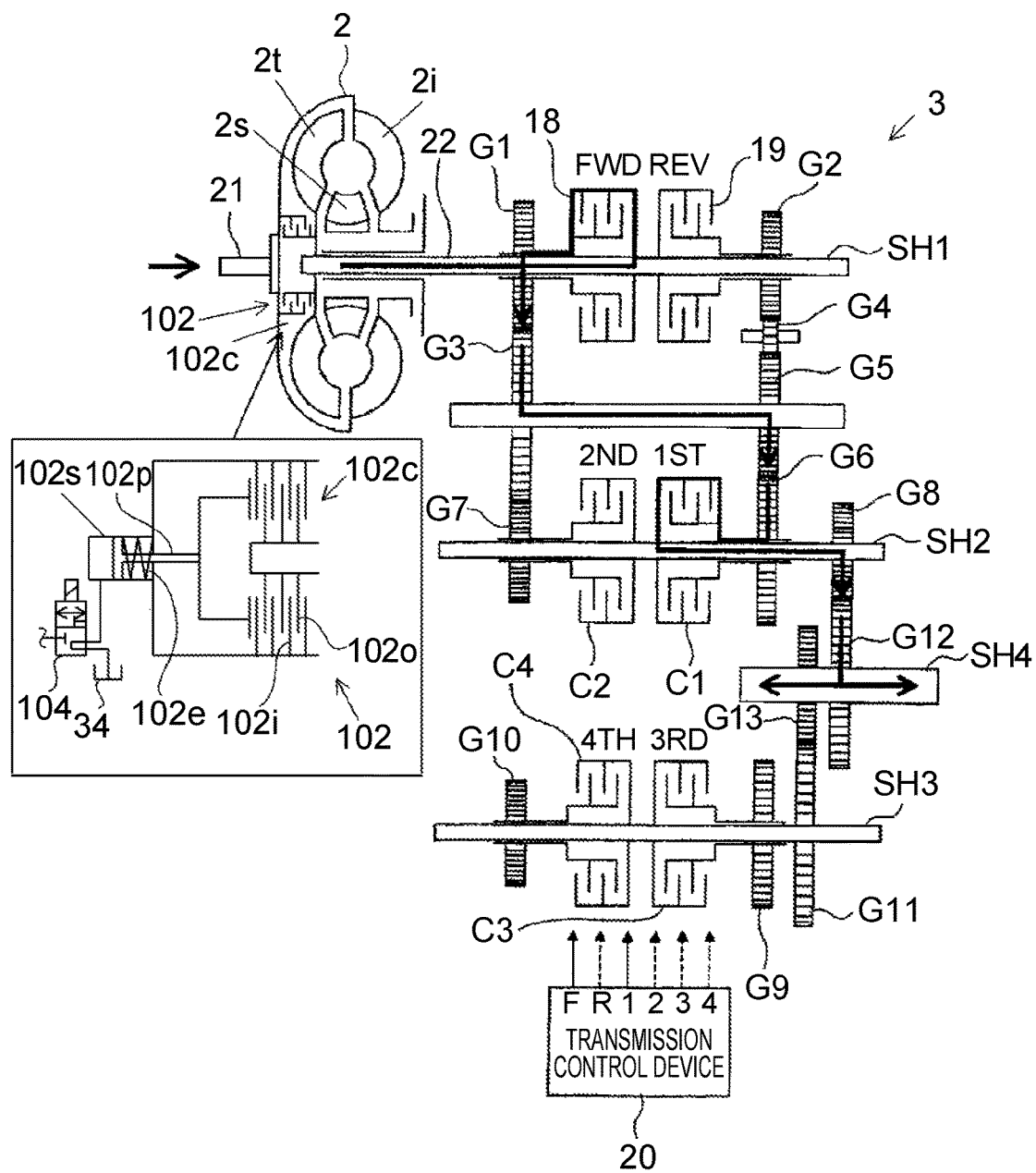
FIG. 3 is a view a schematic block of a torque converter and a transmission.

FIG. 2 is a diagram showing a schematic block of a wheel loader according to a first embodiment of the present invention. The wheel loader includes a torque converter (hereinafter also called a tor-con) 2 that transmits power of an engine 1 to the wheels 113 through the working fluid. FIG. 3 is a diagram showing a schematic block of the torque converter 2 and a transmission 3. Incidentally, FIG. 3 also shows a schematic block of a lock-up clutch 102.

An input shaft 21 (refer to FIG. 3) of the tor-con 2 is coupled to the output shaft of the engine 1 that is a driving source; the transmission 3 is coupled to an output shaft 22 (refer to FIG. 3) of the tor-con 2. As shown in FIG. 3, the tor-con 2 is a hydraulic power transmission device that has: an impeller 2*i* coupled to the input shaft 21; a turbine 2*t* coupled to the output shaft 22, and a stator 2*s* that is fixed to a housing of the tor-con 2 or the transmission 3 or coupled thereto through a one-way clutch. Rotation of the engine 1 is transmitted to the transmission 3 through the tor-con 2.

The wheel loader has the lock-up clutch 102 that is located between the input member of the tor-con 2 including the impeller 2$i$ and the input shaft 21 and the output member of the tor-con 2 including the turbine 2$t$ and the output shaft 22 and is capable of switching the input member and the output member between an engagement state and a non-engagement state.

The lock-up clutch 102 has a clutch part 102$c$, a spring 102$e$, a piston 102$p$, and an oil chamber 102$s$. The clutch part 102$c$ has multiple friction boards including a friction board (also described as an input-shaft side friction board) 102$i$ attached to the input shaft 21 and a friction board (also described as an output-shaft side friction board) 102$o$ attached to the output shaft 22. The spring 102$e$ is an elastic member that gives elastic power in a direction that separates the friction boards of which the clutch part 102$c$ is comprised. When hydraulic oil is supplied to the oil chamber 102$s$, the piston 102$p$ energizes the both friction boards of which the clutch part 102$c$ is comprised in a direction that puts the friction boards nearer to each other against the elastic power of the spring 102$e$.

The clutch part 102$c$ of the lock-up clutch 102 is switched to either state of the engagement state where the input-shaft side friction board 102$i$ and the output-shaft side friction board 102$o$ contact to each other or the non-engagement state (disengagement state) where multiple input-shaft side friction boards 102$i$ and the output-shaft side friction boards 102$o$ do not contact to each other, by oil control as will be described later. When the clutch part 102$c$ of the lock-up clutch 102 becomes the engagement state, the impeller 2$i$ and the turbine 2$t$ are directly coupled mechanically, and are made rotatable as one body.

The lock-up clutch 102 according to this embodiment is a lock-up clutch of a positive type that is switched to the non-engagement state by the elastic power of the spring 102$e$ and is switched to the engagement state by the hydraulic oil discharged from an accumulator 103 that is a hydraulic source driven independently from driving of the engine 1.

When the clutch part 102$c$ of the lock-up clutch 102 becomes the non-engagement state (disengagement state), the impeller 2$i$ produces a flow of the working fluid (also described as tor-con oil), and the turbine 2$t$ facing it receives an inertia force of the flow to drive the output shaft 22. The stator 2$s$ located between the impeller 2$i$ and the turbine 2$t$ generates a torque amplification action by rectifying a discharge flow (return flow) from the turbine 2$t$ and returning it to the impeller 2$i$.

Thus, the tor-con 2 has a function of increasing an output torque to an input torque. A torque ratio becomes small with an increase in a tor-con speed ratio e (=No/Ni) that is a ratio of the rotational speed Ni of the input shaft 21 of the tor-con 2 and the rotational speed No of the output shaft 22. For example, when a traveling load becomes large during traveling with the engine rotational speed in a fixed state, the rotational speed No of the output shaft 22 of the tor-con 2 falls, i.e., a vehicle speed drops, which causes the tor-con speed ratio e to become small.

The transmission 3 has a hydraulic clutch that switches its speed stage to, for example, a first gear speed to a fourth gear speed, and speed of rotation of the output shaft 22 of the tor-con 2 is changed by the transmission 3. As shown in FIG. 2, the rotation after the speed change is transmitted to the wheels (tires) 113 through a propeller shaft 4 and an axle 5, and the wheel loader travels.

As shown in FIG. 3, the transmission 3 changes a tor-con output to any one of the first gear speed to the fourth gear speed. The transmission 3 has multiple clutch shafts SH1 to SH3, an output shaft SH4, multiple gears G1 to G13, a hydraulic clutch for advance travel (forward clutch) 18, a hydraulic clutch for reverse travel (reverse clutch) 19, hydraulic clutches C1 to C4 for the first to fourth gear speeds. Each of the hydraulic clutches 18, 19, and C1 to C4 performs an engagement operation or a release operation by the hydraulic oil (clutch pressure) supplied thereto through a transmission control device 20. That is, when the clutch pressure supplied to the hydraulic clutches 18, 19, and C1 to C4 increases, the clutches 18, 19, and C1 to C4 perform the engagement operation; when the clutch pressure decreases, the clutches perform the release operation.

The output shaft 22 of the tor-con 2 is coupled to the clutch shaft SH1, and both ends of the output shaft SH4 are coupled to an axle 5 located in the front and the rear of the vehicle through the propeller shaft 4 of FIG. 2. In FIG. 3, a forward clutch 18 and a clutch C1 for first gear speed are in the engagement state and other clutches 19, and C2 to C4 are in a release state. In this case, while the gear G1 and the clutch shaft SH1 rotate together as one body, the gear G6 and the clutch shaft SH2 rotate together as one body.

At this time, an output torque of the engine 1 is transmitted to the output shaft SH4 through the input shaft 21 and the output t shaft 22 of the tor-con 2, the clutch shaft SH1, the forward clutch 18, the gears G1, G3, G5 and G6, the clutch C1 for first gear speed, the clutch shaft SH2, and the gears G8, G12. Thereby, first gear speed traveling becomes possible.

When the speed is changed from the first gear speed to a second gear speed, the clutch C1 for first gear speed is switched to the release state by the clutch pressure supplied through the transmission control device 20, and the clutch C2 for second gear speed is switched to the engagement state. Thereby, the output torque of the engine 1 is transmitted to the output shaft SH4 through the input shaft 21 of the tor-con 2, the output shaft 22, the clutch shaft SH1, the forward clutch 18, the gears G1, G3, and G7, the clutch C2 for second gear speed, the clutch shaft SH2, and the gears G8, G12, which makes possible second gear speed traveling. Speed changes other than from the first gear speed to the second gear speed, i.e., speed changes from the second gear speed to the third gear speed, from the third gear speed to the fourth gear speed, from the fourth gear speed to the third gear speed, from the third gear speed to the second gear speed, and from the second gear speed to the first gear speed, are also performed by controlling the clutches C1 to C4 similarly.

Incidentally, regarding the speed stages of the transmission 3, the speed change is automatically controlled by a system, such as of a control based on the tor-con speed ratio in which when the tor-con speed ratio reaches a specified value, the speed is changed, or of a control based on the vehicle speed in which when the vehicle speed reaches a specified value, the speed is changed.

As shown in FIG. 2, a hydraulic circuit HC1 includes a hydraulic pump (hereinafter described as a main pump) 13 that is driven by the engine 1 to supply the hydraulic oil to actuators of a working device and a steering device, an actuator 71 for front device, a control valve 70 for front device, a steering cylinder 61, a steering valve 60, a flow dividing valve 15, and a tank 34. Incidentally, although not illustrated, hydraulic equipment, such as a relief valve for protecting the hydraulic circuit HC1, are also connected to the hydraulic circuit HC1.

The flow dividing valve 15 divides a flow of the hydraulic oil discharged from the main pump 13 to a side of the actuator 71 for front device and a side of the steering cylinder 61 by a predetermined flow division ratio.

As shown in FIG. 1 and FIG. 2, a front working device 119 of the wheel loader according to this embodiment is configured with the arm 111, the bucket 112, the actuators 71 for front device, and the control valve 70 for front device. Although as the actuators 71 for front device, there are the arm cylinder 117 for driving the arm 111 rotationally and the bucket cylinder 115 for driving the bucket 112 rotationally, they are generally named as the actuator 71 for front device, which is explained in the following. As shown in FIG. 2, the control valve 70 for front device controls the flow of the hydraulic oil from the main pump 13 to the actuator 71 for front device.

The steering device of the wheel loader according to this embodiment is configured including the steering cylinder 61 and the steering valve 60. Incidentally, although one pair of steering cylinders 61 is provided, one of the steering cylinders 61 is illustrated in FIG. 2 as a representative of the pair. The one pair of steering cylinders 61 is provided between the front vehicle body 110 and the rear vehicle body 120. A base end of the one pair of steering cylinders 61 is coupled to the front vehicle body 110, and a piston rod of the one pair of steering cylinders 61 is coupled to the rear vehicle body 120, respectively.

The main pump 13 is driven by the engine 1, and the hydraulic oil discharged from this main pump 13 is supplied to the steering cylinder 61 through the flow dividing valve 15 and the steering valve 60, and is supplied to the actuator 71 for front device through the flow dividing valve 15 and the control valve 70 for front device. The control valve 70 for front device is driven by manipulation of manipulation levers (72, 73), and the actuator 71 for front device is driven according to manipulation amounts of the manipulation levers (72, 73).

The arm manipulation lever 72 is a control lever by which the arm 111 is manipulated and that outputs ascending/descending directions of the arm. The bucket manipulation lever 73 outputs tilt/dump directions of the bucket 112.

A steering wheel 62 is a manipulation member for manipulating a traveling direction of the vehicle, and makes the steering valve 60 operate according to its rotated angle. The steering valve 60 controls flows of the hydraulic oil from the main pump 13 to the steering cylinders 61, i.e., a flow direction and a flow rate to each of the one pair of steering cylinders 61, according to a rotation angle of the steering wheel 62. When the steering wheel 62 is manipulated, the one pair of steering cylinders 61 is expanded and contracted, the front vehicle body 110 is rotated to the rear vehicle body 120, and thus steering is performed.

A controller 10 and an engine controller 9 are each configured to include an arithmetic processing unit that has a CPU, ROM, RAM, other peripheral circuits, etc. The controller 10 and the engine controller 9 are connected to each other, and transmit and receive a signal to and from each other.

An ignition switch 86 that directs activation of power supply unit 54 and starting of the engine 1 is connected to the controller 10, and a manipulation position of the ignition switch 86 is detected by the controller 10. The ignition switch 86 is switched to any position of a START position, an ON position, and an OFF position by an unillustrated engine key being inserted into the ignition switch 86 and being rotated.

When the ignition switch 86 is manipulated to the ON position, that is, when activation of the power supply unit 54 is directed by the ignition switch 86, the power supply unit 54 is activated. When the power supply unit 54 is activated, electric power is supplied to control devices, such as the controller 10 and the engine controller 9, and other electric components used at the time of traveling, from the power supply unit 54.

When the ignition switch 86 is manipulated to the START position, that is, when the starting of the engine 1 is directed by the ignition switch 86, a start command is outputted to the engine controller 9 from the controller 10. When the start command is inputted into the engine controller 9, the engine controller 9 outputs a driving command to a starter 81 and makes the starter 81 start the engine 1. When an operator releases his/her hand from the ignition switch 86 and stops the manipulation, the ignition switch 86 returns to the ON position by elastic power of a spring (unillustrated), and is held at the ON position. When the operator manipulates the ignition switch 86 to the OFF position, the controller 10 and the engine controller 9 halt the engine 1 and the power supply unit 54 by performing predetermined end processing.

A pedal manipulation amount detector 52*a* that detects an amount of pedal manipulation Sa (a pedal stroke or a pedal angle) of an accelerator pedal 52 and outputs a detection signal to the controller 10 is connected to the controller 10. An engine rotation speed sensor 50 that detects the actual rotational speed Na of the engine 1 and outputs a detection signal to the engine controller 9 is connected to the engine controller 9. The detection signal of the actual rotational speed Na of the engine 1 detected by the engine rotation speed sensor 50 is outputted to the controller 10 through the engine controller 9.

The controller 10 sets a target rotational speed Nt of the engine 1 according to an amount of manipulation of the accelerator pedal 52 detected by the pedal manipulation amount detector 52*a*, outputs a target rotational speed direction to the engine controller 9, and thereby controls the actual rotational speed (number of rotations [rpm]) of the engine 1. When the amount of pedal manipulation Sa of the accelerator pedal 52 becomes large, the target rotational speed Nt of the engine 1 becomes large, and the target rotational speed Nt at the time of maximum stepping-in of the pedal becomes a highest rotational speed. When the operator wishes to increase the vehicle speed or increase a traveling driving force, the operator increases the manipulation amount Sa of the accelerator pedal 52 to increase the engine rotational speed.

The engine controller 9 compares the actual rotational speed Na of the engine 1 detected by the engine rotation speed sensor 50 and the target rotational speed Nt of the engine 1 that is a direction value from the controller 10, and controls a fuel injection device 51 so that the actual rotational speed Na of the engine 1 may be brought close to the target rotational speed Nt.

As shown in FIG. 2, a hydraulic circuit HC2 has an accumulator (pressure storage device) 103 for storing the hydraulic oil discharged from the hydraulic pump (hereinafter described as a pump 14) driven by the engine 1 and an directional solenoid valve 104 that is provided between the accumulator 103 and the lock-up clutch 102 of the torque converter 2 and controls the flow of the hydraulic oil discharged from the accumulator 103.

In the hydraulic circuit HC2, the accumulator 103 is provided between the directional solenoid valve 104 and the pump 14, and a check valve 105 is provided on the upstream side of the accumulator 103. The check valve 105 prevents the hydraulic oil accumulated in the accumulator 103 from flowing backwards toward the pump 14, and preserves the pressure of the accumulator 103.

The directional solenoid valve 104 is a control valve capable of switching between an open position at which the accumulator 103 and the lock-up clutch 102 of the tor-con 2 are communicated and a closed position at which the accumulator 103 and the lock-up clutch 102 of the tor-con 2 are intercepted.

When an ON signal is outputted from the controller 10 and the ON signal is inputted into a solenoid of the directional solenoid valve 104, the solenoid is magnetized and the directional solenoid valve 104 is switched to the open position. When an OFF signal is outputted from the controller 10 and the OFF signal is inputted into the solenoid of the directional solenoid valve 104, the solenoid is demagnetized and the directional solenoid valve 104 is switched to the closed position by the elastic power of the spring.

As shown in FIG. 3, when the directional solenoid valve 104 is switched to the closed position, the oil chamber 102s of the lock-up clutch 102 is made to communicate with the tank 34, and a gap is formed between the friction boards by the elastic power of the spring 102e, which causes the clutch part 102c to be in the non-engagement state. When the directional solenoid valve 104 is switched to the open position and the hydraulic oil discharged from the accumulator 103 is supplied to the oil chamber 102s, the piston 102p moves in an illustrated right direction, the friction boards contact with each other, and the clutch part 102c becomes the engagement state.

As shown in FIG. 2, an air heater 82 that is operated at the time of the starting at a low temperature to warm intake air and the starter 81 that has a sel-motor for rotating a ring gear (flywheel) of the engine 1 at the time of the engine starting are attached to the engine 1. The air heater 82 is connected to the engine controller 9, and generates heat only during a time in which an ON signal is being inputted from the engine controller 9 to warm the intake air. The engine controller 9 outputs a signal indicating that the air heater 82 is being operated during a time in which the air heater 82 is operating to the controller 10. The engine controller 9 operates the air heater 82 when a cooling water temperature of the engine 1 is less than a specified temperature, and does not operate the air heater 82 when the cooling water temperature of the engine 1 is more than or equal to the above-mentioned specified temperature.

The starter 81 is connected to the engine controller 9 and rotates the engine 1 by driving the sel-motor only during a time in which the driving command (ON signal) is being inputted from the engine controller 9. The engine controller 9 outputs the driving command to the sel-motor only during a time in which the start command from the controller 10 is being inputted.

As for working fluid of the tor-con 2, the lower the temperature, the higher the viscosity of the working fluid becomes. For this reason, when the lock-up clutch 102 is in the non-engagement state at the time of the starting of the engine 1, the lower the working fluid temperature, the larger the resistance of the flow becomes, and a load acting on the engine 1 increases. In contrast, the higher the working fluid temperature, the smaller the resistance of the flow of the working fluid becomes, and the load acting on the engine 1 decreases. Since the working fluid rotates together with the impeller 2i and the turbine 2t when the lock-up clutch 102 is in the engagement state, the resistance of the flow almost never arises. However, when the lock-up clutch 102 is in the engagement state at the time of the engine starting, a part of the transmission 3 in a neutral state will rotate together with the engine 1 from a time of the engine starting.

For this reason, when the working fluid temperature of the tor-con 2 is lower than the specified temperature, the engine load at the time of the engine starting with the lock-up clutch 102 switched to the engagement state becomes smaller than the engine load at the time of the engine starting with the lock-up clutch 102 switched to the non-engagement state. In contrast, when the working fluid temperature of the tor-con 2 is higher than the specified temperature, the engine load at the time of the engine starting with the lock-up clutch 102 switched to the engagement state becomes larger than the engine load at the time of the engine starting with the lock-up clutch 102 switched to the non-engagement state.

Then, in this embodiment, when the temperature state of the working fluid of the tor-con 2 is the low-temperature state, reduction of the engine load at the time of the engine starting is aimed at by switching the lock-up clutch 102 to the engagement state; and when the temperature state of the working fluid of the tor-con 2 is not the low-temperature state, the reduction of the engine load at the time of the engine starting is aimed at by switching the lock-up clutch 102 to the non-engagement state.

The controller 10 has a low-temperature state determination unit 10a, a notification control unit 10b, and a valve control unit 10c as its functions. When the activation of the power supply unit 54 is directed by the ignition switch 86 and the power supply unit 54 is activated, the low-temperature state determination unit 10a determines whether the temperature state of the working fluid of the tor-con 2 is the low-temperature state.

Incidentally, the case where the air heater 82 is operated has a high possibility that a surrounding environment is a low-temperature environment and the temperature state of the working fluid of the tor-con 2 is also the low-temperature state. Therefore, in this embodiment, when the signal indicating that the air heater 82 is operating from the engine controller 9 is inputted, the low-temperature state determination unit 10a determines that the temperature state of the working fluid of the tor-con 2 is the low-temperature state. When the signal indicating that the air heater 82 is operating is not inputted from the engine controller 9, the low-temperature state determination unit 10a determines that the temperature state of the working fluid of the tor-con 2 is not the low-temperature state.

When it is determined by the low-temperature state determination unit 10a that the temperature state of the working fluid of the tor-con 2 is the low-temperature state, the notification control unit 10b outputs a lighting signal for turning ON the lamp 16 to a lamp 16. When it is determined by the low-temperature state determination unit 10a that the temperature state of the working fluid of the tor-con 2 is not the low-temperature state, the notification control unit 10b outputs a light-off signal for turning OFF the lamp 16 to the lamp 16. The lamp 16 is a display device connected to the controller 10, and is controlled between lighting on and lighting off based on the signal from the controller 10. That is, in this embodiment, while the air heater 82 is operating, the lamp 16 is ON, and when the air heater 82 is stopped, the lamp 16 turns OFF.

When it is determined by the low-temperature state determination unit 10a that the temperature state of the working fluid of the tor-con 2 is the low-temperature state, in order to switch the lock-up clutch 102 to the engagement state, the valve control unit 10c outputs the ON signal (magnetizing current) to the solenoid of the directional solenoid valve 104, and switches the directional solenoid valve 104 to the open position. Incidentally, when it is determined by the low-temperature state determination unit 10a that the temperature state of the working fluid of the tor-con 2 is not the low-temperature state, in order to switch the lock-up clutch 102 to the non-engagement state, the valve control unit 10c outputs the OFF signal to the solenoid of the directional solenoid valve 104, and switches the directional solenoid valve 104 to the closed position. For this reason, when the temperature state of the working fluid of the tor-con 2 is not the low-temperature state at the time of the engine starting, the directional solenoid valve 104 will maintain the closed position.

When the starting of the engine 1 is directed by the ignition switch 86, the engine controller 9 outputs a driving command to the sel-motor of the starter 81, and rotates the engine 1 with the sel-motor. The engine controller 9 determines whether the actual rotational speed Na of the engine 1 is more than or equal to a starter secession rotational speed Na1 that was decided in advance. When it is determined that the actual rotational speed Na is more than or equal to the starter secession rotational speed Na1, the engine controller 9 controls the fuel injection device 51 so that the actual rotational speed Na of the engine 1 may become the target rotational speed Nt.

When the engine 1 is started by the starter 81 with the lock-up clutch 102 in the engagement state, the valve control unit 10c determines whether the actual rotational speed Na of the engine 1 is more than or equal to a release rotational speed Na2 that was decided in advance. When it is determined that the actual rotational speed Na is more than or equal to the release rotational speed Na2, the lock-up clutch 102 outputs an OFF signal to the solenoid of the directional solenoid valve 104 and switches the directional solenoid valve 104 to the closed position in order to switch the lock-up clutch 102 to the non-engagement state.

For the release rotational speed Na2, a value more than or equal to the starter secession rotational speed Na1 is set up (Na2>=Na1). The release rotational speed Na2 is stored in advance in a storage device of the controller 10. The starter secession rotational speed Na1 corresponds to a rotational speed of the engine 1 at which fuel injection control by the fuel injection device 51 is initiated, and is stored in advance in storage devices of the controller 10 and the engine controller 9. As the starter secession rotational speed Na1, a value of about 400 to 600 rpm is adopted, for example.

Incidentally, the valve control unit 10c may be configured to determine whether a signal from the engine controller 9 indicating that the actual rotational speed Na becomes more than or equal to the starter secession rotational speed Na1, for example, a fuel injection initiation signal, is inputted into the controller 10 in place of determining whether the actual rotational speed Na is more than or equal to the release rotational speed Na2.

Figure 4:
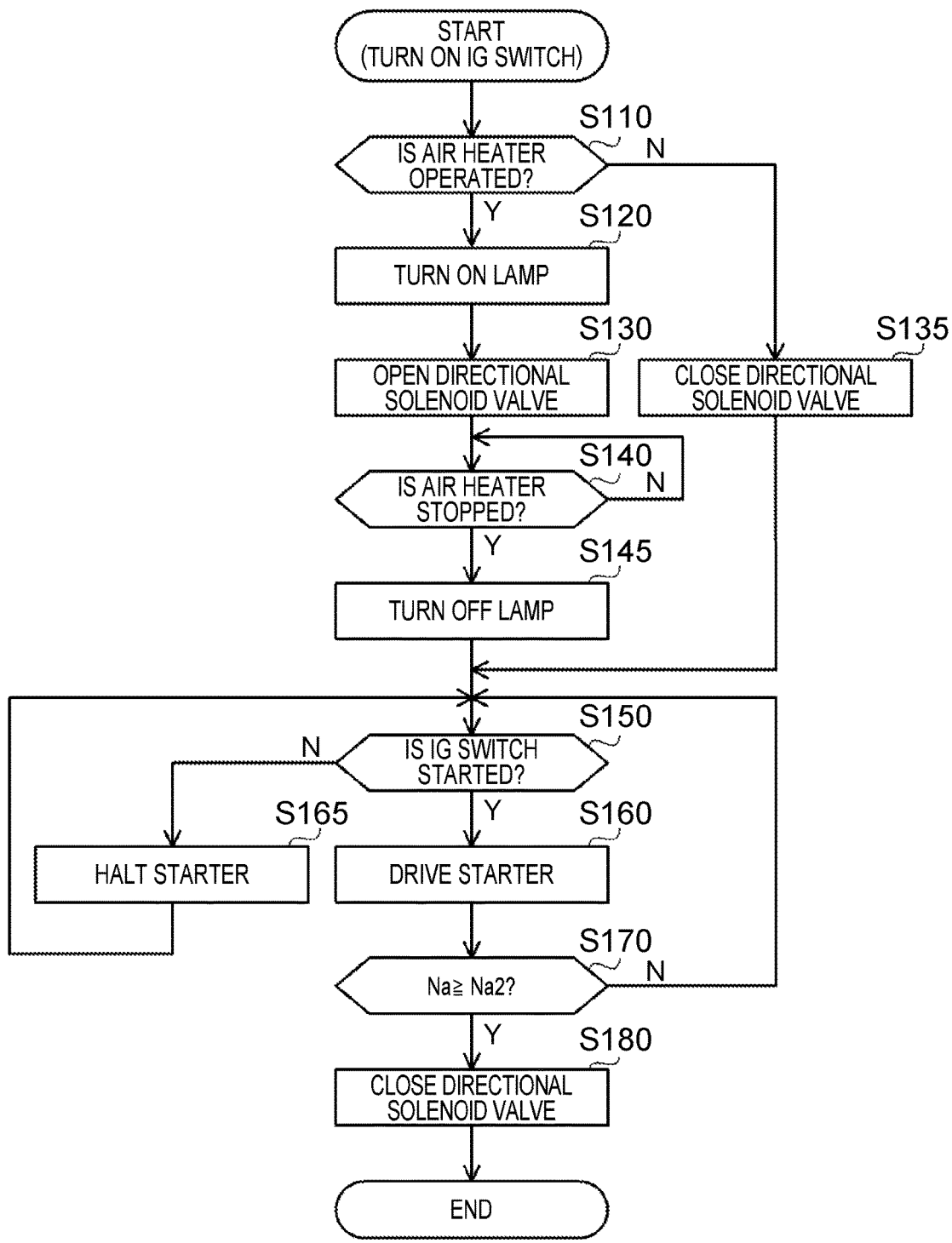
FIG. 4 is a flowchart showing one example of engine start processing performed by a controller according to the first embodiment of the present invention.

FIG. 4 is a flowchart showing one example of engine start processing performed by the controller 10. The processing shown in FIG. 4 is initiated by the ignition switch 86 being manipulated from the OFF position to the ON position. Incidentally, although not illustrated, the controller 10 acquires information, including the actual rotational speed Na of the engine 1 detected by the engine rotation speed sensor 50, an operating signal of the air heater 82, etc., repeatedly for every predetermined control period.

As shown in FIG. 4, in step S110, the controller 10 determines whether the temperature state of the working fluid of the tor-con 2 is the low-temperature state. In this embodiment, in step S110, the controller 10 determines whether the temperature state of the working fluid of the tor-con 2 is the low-temperature state by determining whether the air heater 82 is operating. When an affirmative determination is made in step S110, that is, when it is determined that the temperature state of the working fluid of the tor-con 2 is the low-temperature state, the process progresses to step S120. When a negative determination is made in step S110, that is, when it is determined that the temperature state of the working fluid of the tor-con 2 is not the low-temperature state, the process progresses to step S135.

In step S120, the controller 10 outputs the lighting signal to the lamp 16, turns ON the lamp 16, and progresses the process to step S130. In step S130, in order to switch the directional solenoid valve 104 to the open position, the controller 10 outputs the ON signal to the directional solenoid valve 104, and progresses the process to step S140.

In step S140, the controller 10 determines whether the air heater 82 stops. The controller 10 performs the processing of step S140 repeatedly until the affirmative determination is made. When the signal indicating that the air heater 82 is operating is no longer inputted, the controller 10 determines that the air heater 82 is stopped in step S140, and progresses the process to step S145.

In step S145, the controller 10 outputs the light-off signal to the lamp 16 to make the lamp 16 turn off, and progresses the process to step S150.

In step S135, in order to maintain the directional solenoid valve 104 at the closed position, the controller 10 outputs the OFF signal to the directional solenoid valve 104, and progresses the process to step S150.

In step S150, the controller 10 determines whether the ignition switch 86 is manipulated to the START position. When the affirmative determination is made in step S150, the process progresses to step S160; when the negative determination is made in step S150, the process progresses to step S165.

In step S160, in order to drive the starter 81, the controller 10 outputs the start command to the engine controller 9, and progresses the flow to step S170. In step S170, the controller 10 determines whether the actual rotational speed Na of the engine 1 is more than or equal to the release rotational speed Na2. When the affirmative determination is made in step S170, the process progresses to step S180; when the negative determination is made in step S170, the process returns to step S150.

In step S180, in order to switch the directional solenoid valve 104 to the closed position, the controller 10 outputs the OFF signal to the directional solenoid valve 104, and ends the processing shown in the flowchart of FIG. 4. Incidentally, when the negative determination is made in step S150, the process progresses to step S165; in step S165, in order to maintain stop of the starter 81, the controller 10 outputs a stop command to the engine controller 9, and the flow returns to step S150.

Main operations of this embodiment are explained. An operator boards in the cab 121, inserts an ignition key into the ignition switch 86, rotates the ignition key, and manipulates the ignition switch 86 to the ON position. When the ignition switch 86 is turned ON, electric power is supplied to the electrical components used at the time of traveling including the controller 10, the engine controller 9, and others from the power supply unit 54.

When the working fluid of the tor-con 2 is in the state where it is at a low temperature and its viscosity is high, if the engine 1 is started with the clutch part 102c of the lock-up clutch 102 switched to the non-engagement state, there will be a possibility that resistance of the working fluid of the tor-con 2 will be large and the engine cannot be started or it will take a time to start the engine 1.

In this embodiment, when the temperature state of the working fluid of the tor-con 2 is the low-temperature state, the clutch part 102c of the lock-up clutch 102 is switched to the engagement state. Incidentally, until the clutch part 102c shifts to a perfect engagement state from the non-engagement state by means of the hydraulic oil discharged from the accumulator 103, a slight period of time (for example, less than 1 second) is needed.

The lamp 16 is a notification device for notifying that the starting of the engine 1 is prohibited. An operation manual of the wheel loader etc. describes that during a time in which the lamp 16 is ON, the ignition switch 86 should not be manipulated to the START position, as a note. For this reason, during a time in which the lamp 16 is ON, the operator stands by in a state where the ignition switch 86 is being manipulated to the ON position. The lamp 16 stays turned ON during a time in which the air heater 82 is operating. Usually, an operating time of the air heater 82 is longer than a time until the clutch part 102c becomes the perfect engagement state from the non-engagement state.

When the lamp 16 turns OFF, the operator manipulates the ignition switch 86 to the START position. When the ignition switch 86 is manipulated to the START position, the starter 81 is driven and the engine 1 is driven to rotate by the sel-motor of the starter 81.

If the actual rotational speed Na of the engine 1 goes up to the starter secession rotational speed Na1, the fuel injection control by the fuel injection device 51 is initiated. The operator performs a return operation of returning the ignition switch 86 to the ON position to initiate an operation of the wheel loader.

In this embodiment, since when the temperature state of the working fluid of the tor-con 2 is the low-temperature state, the engine 1 is driven to rotate with the lock-up clutch 102 in the engagement state, it is possible to make small the load acting on the engine 1 as compared with a case where the lock-up clutch 102 is in the non-engagement state. In contrast, since when the temperature state of the working fluid of the tor-con 2 is not the low-temperature state, the engine 1 is driven to rotate with the lock-up clutch 102 in the non-engagement state, it is possible to make small the load acting on the engine 1 as compared with a case where the lock-up clutch 102 is in the engagement state. Thereby, it is possible to obtain excellent startability of the engine 1 irrespective of the temperature state of the working fluid of the tor-con 2.

According to the embodiments described above, the following action effects can be obtained. (1) The wheel loader has the torque converter 2 for transmitting power of the engine 1 to the wheels 113 through the working fluid and the lock-up clutch 102 capable of switching the input member and the output member of the torque converter 2 between the engagement state and the non-engagement state. The flow of the hydraulic oil discharged from the accumulator 103 is controlled by the directional solenoid valve 104. The directional solenoid valve 104 switches the lock-up clutch 102 to either state of the engagement state or the non-engagement state by controlling the flow of the hydraulic oil discharged from the accumulator 103.

When the ignition switch 86 is manipulated to the ON position, the starting of the power supply unit 54 is directed by the ignition switch 86, and the power supply unit 54 is activated, the controller 10 to which electric power is supplied from the power supply unit 54 determines whether the temperature state of the working fluid of the torque converter 2 is the low-temperature state. When it is determined that the temperature state of the working fluid of the torque converter 2 is not the low-temperature state, the controller 10 controls the directional solenoid valve 104 in order to switch the lock-up clutch 102 to the non-engagement state. When it is determined that the temperature state of the working fluid of the torque converter 2 is the low-temperature state, the controller 10 controls the directional solenoid valve 104 in order to switch the lock-up clutch 102 to the engagement state. When the ignition switch 86 is manipulated to the START position and the starting of the engine 1 is directed by the ignition switch 86, the starter 81 activates the engine 1.

When the working fluid of the torque converter 2 is in the low-temperature state, by switching the lock-up clutch 102 to the engagement state, the working fluid (tor-con oil) of high viscosity inside the torque converter 2 rotates together with the impeller 2i and the turbine 2t, which prevents the working fluid from being stirred inside the torque converter 2. Since the working fluid can be suppressed from moving relatively to the impeller 2i and the turbine 2t, starting load of the engine 1 can be reduced and engine startability can be improved.

When the working fluid of the torque converter 2 is not in the low-temperature state, since the engine 1 and the transmission 3 can be separated by switching the lock-up clutch 102 to the non-engagement state, the starting load of the engine 1 can be reduced and the engine startability can be improved.

(2) When the engine 1 is started by the starter 81 with the lock-up clutch 102 in the engagement state, and at the same time, the actual rotational speed Na of the engine 1 becomes more than or equal to the predetermined release rotational speed Nat, the controller 10 controls the directional solenoid valve 104 and switches the lock-up clutch 102 to the non-engagement state. After the engine 1 is controlled by the fuel injection device 51 and the starting of the engine 1 by the starter 81 is completed, the lock-up clutch 102 can be automatically shifted to the non-engagement state.

(3) The controller 10 makes the lamp 16 notify that the starting of the engine 1 is prohibited for a predetermined time after the power supply unit 54 was activated. In this embodiment, during a time in which the air heater 82 is being operated, the lamp 16 is made to turn ON to notify the operator that the starting of the engine 1 is prohibited. The predetermined time in which the air heater 82 is being operated is longer than a transition time while the power supply unit 54 is activated and the lock-up clutch 102 becomes the perfect engagement state from the non-engagement state. Thereby, it is possible to prevent the ignition switch 86 from being operated to the START position while the lock-up clutch 102 is in the non-engagement state.

(4) As the hydraulic source for supplying the hydraulic oil to the lock-up clutch 102, the accumulator 103 driven independently from the driving of the engine 1 is adopted. The controller 10 switches the lock-up clutch 102 to the engagement state or the non-engagement state based on a determination result by the low-temperature state determination unit 10a before the power supply unit 54 is activated, and at the same time, the starting of the engine 1 is directed by the ignition switch 86. By this, the power supply unit 54 is activated, and, it is possible to supply the hydraulic oil to the lock-up clutch 102 and to switch the lock-up clutch 102 to the engagement state even in a state before the starting of the engine 1 is directed by the ignition switch 86, i.e., in a state where the engine 1 is not rotating. According to this embodiment, when it is determined that the temperature state of the working fluid of the tor-con 2 is the low-temperature state, it is possible to initiate the starting of the engine 1 by the starter 81 after switching the lock-up clutch 102 to the engagement state. For this reason, it is possible to shorten a time from manipulating the ignition switch 86 to the START position until the starting of the engine 1 is completed as compared with a case where the lock-up clutch 102 is shifted to the engagement state after initiating the starting of the engine 1 by the starter 81.

(5) The wheel loader has the air heater 82. The controller 10 determines whether the air heater 82 is being operated, and determines that the temperature state of the working fluid of the tor-con 2 is the low-temperature state when it is determined that the air heater 82 is being operated. It is not necessary to provide the temperature sensor of the working fluid of the tor-con 2 etc. individually by switching the lock-up clutch 102 to the engagement state being interlocked with the operation of the air heater 82, and it is possible to aim at reducing the number of parts and its cost.

Modification of First Embodiment

In step S110 of FIG. 4, the controller 10 may determine whether the engine 1 is being stopped. In this case, in step S110, when the air heater 82 is being operated, and at the same time, the engine 1 is being stopped, the affirmative determination is made, and the process progresses to step S120. In step S110, when the air heater 82 is not being operated, or when the engine is not stopped, the negative determination is made, and the process progresses to step S150 or "END" unlike that of FIG. 4.

Thereby, it is possible to prevent the lock-up clutch 102 from becoming the engagement state when the air heater 82 malfunctions while the engine 1 is rotating. Incidentally, it can be determined whether the engine 1 is being stopped by a fact that the actual rotational speed Na of the engine 1 is less than or equal to a predetermined threshold Na0. The threshold Na0 is a value sufficiently small (0<Na0<Na1) compared with the starter secession rotational speed Na1, for example, a few tens of rpm etc.

Second Embodiment

Figure 5:
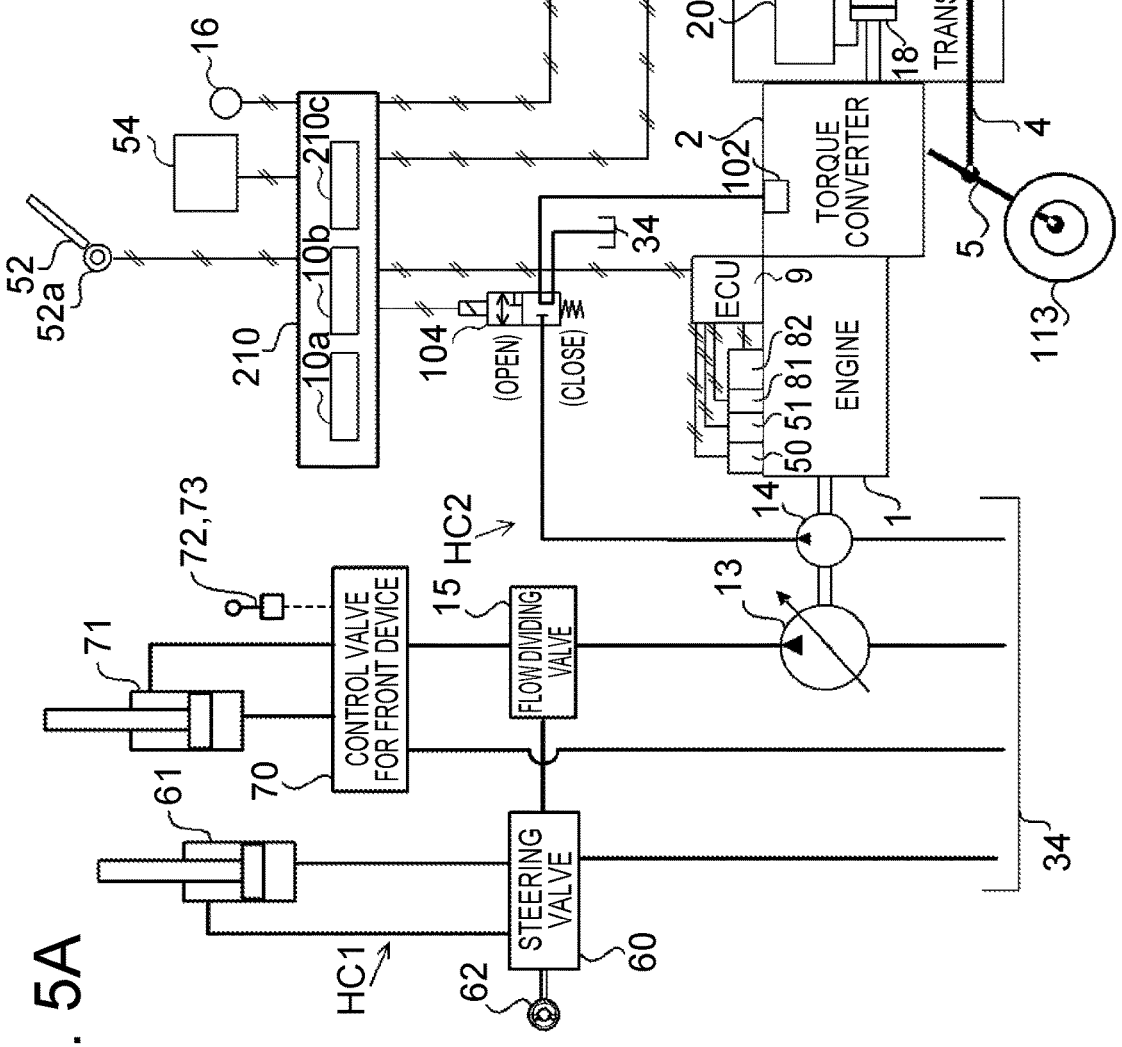
FIG. 5A is a diagram showing a schematic block of a wheel loader according to a second embodiment of the present invention.
FIG. 5B is a schematic diagram of a lock-up clutch according to the second embodiment of the present invention.
Figure 6:
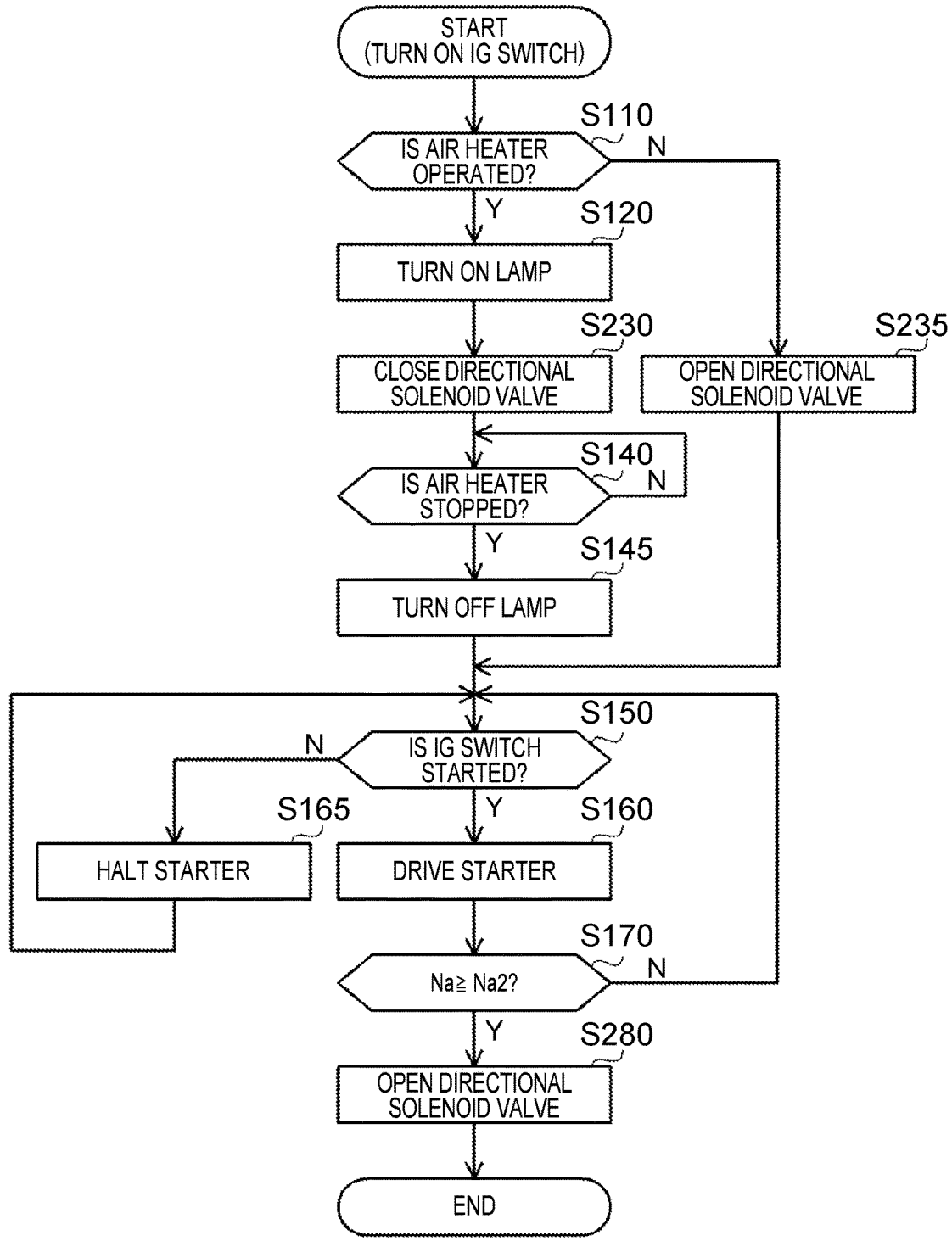
FIG. 6 is a flowchart showing one example of engine start processing performed by a controller according to the second embodiment of the present invention.

With reference to FIG. 5 and FIG. 6, a work vehicle according to a second embodiment of the present invention is explained. Incidentally, the same reference sign is given to the same or corresponding portion as that of the first embodiment in the figures, and different points are mainly explained. FIG. 5A is the same figure as FIG. 2, and is a diagram showing a schematic block of a wheel loader according to the second embodiment of the present invention. FIG. 5B is a schematic block of the lock-up clutch 102 according to the second embodiment of the present invention.

In the first embodiment described above, the example where the lock-up clutch 102 was of the positive type (refer to FIG. 3) and the hydraulic source for supplying the hydraulic oil to the lock-up clutch 102 was the accumulator 103 (refer to FIG. 2) was explained.

In contrast to this, in the second embodiment, as shown in FIG. 5A, the hydraulic source for supplying the hydraulic oil to the lock-up clutch 102 is the pump 14 that discharges the hydraulic oil by the driving of the engine 1. An oil chamber 102s (refer to FIG. 5B) of the lock-up clutch 102 is connected to the pump 14 through the directional solenoid valve 104.

As shown in FIG. 5B, the lock-up clutch 102 according to the second embodiment is a negative-type lock-up clutch that is switched to the engagement state by the elastic power of the spring 102e and is switched to the non-engagement state by making the hydraulic oil discharged from the pump 14 act on the piston 102p of the oil chamber 102s.

The directional solenoid valve 104 is a control valve that is switched between the open position at which the pump 14 and the lock-up clutch 102 of the tor-con 2 are communicated and the closed position at which the pump 14 and the lock-up clutch 102 of the tor-con 2 are intercepted.

When an ON signal is outputted to the solenoid from a controller 210, the solenoid is magnetized and the directional solenoid valve 104 is switched to the open position. When an OFF signal is outputted to the solenoid from the controller 210, the solenoid is demagnetized and the directional solenoid valve 104 is switched to the closed position by the elastic power of the spring.

As shown in FIG. 5B, when the directional solenoid valve 104 is switched to the closed position, the oil chamber 102s of the lock-up clutch 102 is made to communicate with the tank 34, the friction boards come into contact with each other by the elastic power of the spring 102e, and the clutch part 102c becomes the engagement state. When the directional solenoid valve 104 is switched to the open position and the hydraulic oil discharged from the pump 14 is supplied to the oil chamber 102s, the piston 102p moves in an illustrated left direction, a gap is formed between the friction boards, and the clutch part 102c becomes the non-engagement state.

When it is determined by the low-temperature state determination unit 10a that the temperature state of the working fluid is not the low-temperature state, the valve control unit 210c of the controller 210 outputs the ON signal to the solenoid of the directional solenoid valve 104 and switches the directional solenoid valve 104 to the open position. When it is determined by the low-temperature state determination unit 10a that the temperature state of the working fluid is the low-temperature state, the valve control unit 210c of the controller 210 outputs the OFF signal to the solenoid of the directional solenoid valve 104 and switches the directional solenoid valve 104 to the closed position. For this reason, when the temperature state of the working fluid of the tor-con 2 is the low-temperature state at the time of the engine starting, the directional solenoid valve 104 will maintain the closed position.

When the engine 1 is started by the starter 81 with the lock-up clutch 102 in the engagement state, the valve control unit 210c determines whether the actual rotational speed Na of the engine 1 is more than or equal to the release rotational speed Na2. When it is determined that the actual rotational speed Na is more than or equal to the release rotational speed Na2, the valve control unit 210c outputs the ON signal to the solenoid of the directional solenoid valve 104, and switches the directional solenoid valve 104 to the open position.

FIG. 6 is a flowchart showing one example of engine start processing performed by the controller 210. The processing shown in FIG. 6 is initiated by the ignition switch 86 being manipulated from the OFF position to the ON position.

The flowchart of FIG. 6 is the flowchart of FIG. 4 to which processing of steps S230, S235, and S280 is added in place of steps S130, S135, and S180 of the flowchart of FIG. 4. In step S230, in order to switch the directional solenoid valve 104 to the closed position, the controller 210 outputs the OFF signal to the directional solenoid valve 104, and progresses the process to step S140. In step S235, in order to switch the directional solenoid valve 104 to the open position, the controller 210 outputs the ON signal to the directional solenoid valve 104, and progresses the process to step S150.

In step S280, in order to switch the directional solenoid valve 104 to the open position, the controller 210 outputs the ON signal to the directional solenoid valve 104, and ends the processing shown in the flowchart of FIG. 6.

According to the second embodiment like this, it is possible to obtain the following effect in addition to the same effects as those of the first embodiment. (6) The lock-up clutch 102 is a lock-up clutch of a negative type that is switched to the engagement state by the elastic power of the spring 102*e* and is switched to the non-engagement state by the hydraulic oil discharged from the pump 14. Thereby, when the ignition switch 86 is manipulated to the ON position, and at the same time, the temperature state of the working fluid of the tor-con 2 is the low-temperature state, the lock-up clutch 102 is kept with the engagement state being maintained. Since there is no shift operation from the non-engagement state to the engagement state, provided that there is no other restriction, the operator can manipulate the ignition switch 86 from the ON position to the START position immediately.

(7) The wheel loader according to this embodiment is configured so that the hydraulic oil discharged from the pump 14 may be supplied to the lock-up clutch 102 through the directional solenoid valve 104. Thereby, by the starting of the engine 1 being directed by the ignition switch 86 and the engine 1 being driven by the starter 81, the lock-up clutch 102 can be shifted from the engagement state to the non-engagement state by the hydraulic oil discharged from the pump 14. Since this configuration can omit the accumulator 103, it is possible to aim at reducing a cost, the number of parts, and a weight by simplification of the configuration of the hydraulic circuit HC2.

Modifications of Second Embodiment

Although in the second embodiment, the example where the lock-up clutch 102 was of the negative type was explained, the present invention is not limited to this. The lock-up clutch 102 may be of a positive type. In this case, the controller 210 performs the same processing as that of the flowchart of FIG. 4.

Main operations of this modification are explained. When the ignition switch 86 is manipulated to the ON position by the operator and it is determined by the low-temperature state determination unit 10*a* that the temperature state of the working fluid of the tor-con 2 is the low-temperature state, the directional solenoid valve 104 is switched to the open position. In this state, since the pump 14 is not rotating, the clutch part 102*c* of the lock-up clutch 102 is being set to the non-engagement state.

When the ignition switch 86 is manipulated to the START position by the operator, the engine 1 rotates at a low speed by the starter 81. When the engine 1 rotates, the oil discharged from the pump 14 is supplied to the oil chamber 102*s* of the lock-up clutch 102. When the oil pressure acting on the oil chamber 102*s* rises and the clutch part 102*c* shifts to the engagement state, the load of the engine 1 is reduced and the rotational speed of the engine 1 rises to the starter secession rotational speed Na1.

Thus, in this modification, in a state where the ignition switch 86 is in the ON position, the clutch part 102*c* of the lock-up clutch 102 is shifted to the non-engagement state, and in a state where the ignition switch 86 is in the START position, the clutch part 102*c* of the lock-up clutch 102 is shifted to the engagement state. Even in the modification like this, it is possible to reduce the load of the engine 1 and to improve the startability of the engine 1 as compared with a case where the engine 1 is started with the lock-up clutch 102 in the non-engagement state in a low temperature environment.

Third Embodiment

Figure 7:
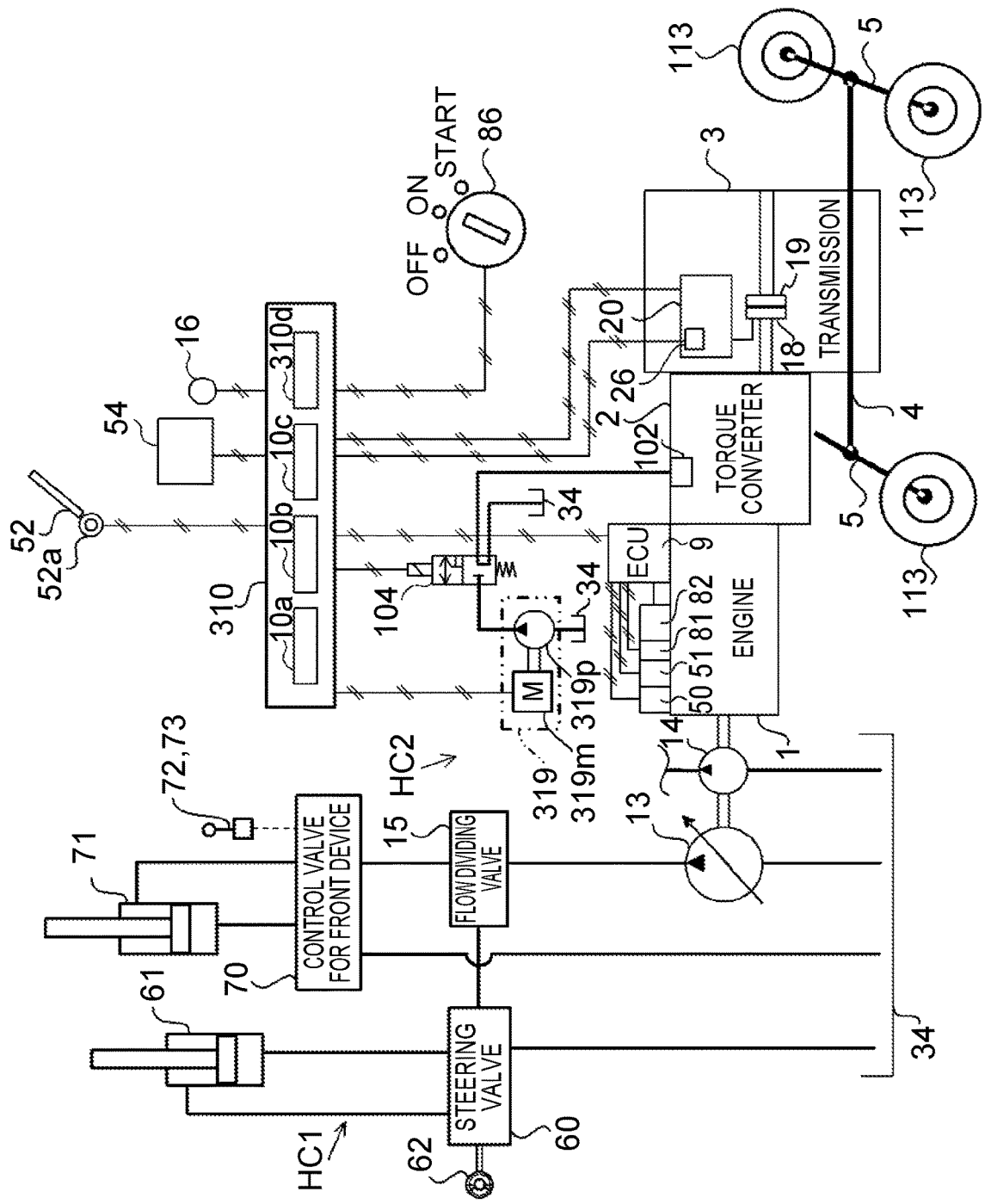
FIG. 7 is a diagram showing a schematic block of a wheel loader according to a third embodiment of the present invention.

With reference to FIG. 7, a work vehicle according to a third embodiment of the present invention is explained. Incidentally, the same reference sign is given to the same or corresponding portion as that of the first embodiment in FIG. 7, and different points are mainly explained. FIG. 7 is a diagram showing a schematic block of a wheel loader according to the third embodiment of the present invention.

The first embodiment had a configuration where the hydraulic oil accumulated in the accumulator 103 was supplied to the lock-up clutch 102 (refer to FIG. 2). In contrast to this, the third embodiment has a configuration where the hydraulic oil discharged from an electric hydraulic pump 319 is supplied to the lock-up clutch 102. The electric hydraulic pump 319 is an electric pump driven independently from the driving of the engine 1, having the electric motor 319*m* and the hydraulic pump 319*p*. Electric power is supplied to the electric motor 319*m* from the power supply unit 54.

A controller 310 has a pump control unit 310*d* as its function in addition to the low-temperature state determination unit 10*a*, the notification control unit 10*b*, and the valve control unit 10*c* that were explained in the first embodiment. When it is determined by the low-temperature state determination unit 10*a* that the temperature state of the working fluid of the tor-con 2 is the low-temperature state, the pump control unit 310*d* outputs a driving signal to the electric motor 319*m*, and drives the electric motor 319*m* to rotate. When it is determined by the low-temperature state determination unit 10*a* that the temperature state of the working fluid of the tor-con 2 is not the low-temperature state, the pump control unit 310*d* outputs a stop signal to an electric motor 319*m*, and halts the electric motor 319*m*. For this reason, when the temperature state of the working fluid of the tor-con 2 is not the low-temperature state at the time of the engine starting, an electric hydraulic pump 319 will maintain a stopped state.

When the electric motor 319*m* is driven, the pump control unit 310*d* determines whether the actual rotational speed Na of the engine 1 is more than or equal to the predetermined release rotational speed Na2. When it is determined that the actual rotational speed Na is more than or equal to the release rotational speed Na2, the pump control unit 310*d* outputs the stop signal to the electric motor 319*m*, and halts the electric motor 319*m*.

In the third embodiment, in step S130 (directional solenoid valve open operation processing) shown in the flowchart of FIG. 4, electric motor driving processing of driving the electric motor 319*m* is performed. Moreover, in step S180 (directional solenoid valve close operation processing) shown in the flowchart of FIG. 4, electric motor halt processing of halting the electric motor 319*m* is performed.

According to the third embodiment like this, it is possible to obtain the same effects as those of the first embodiment.

Fourth Embodiment

Figure 8:
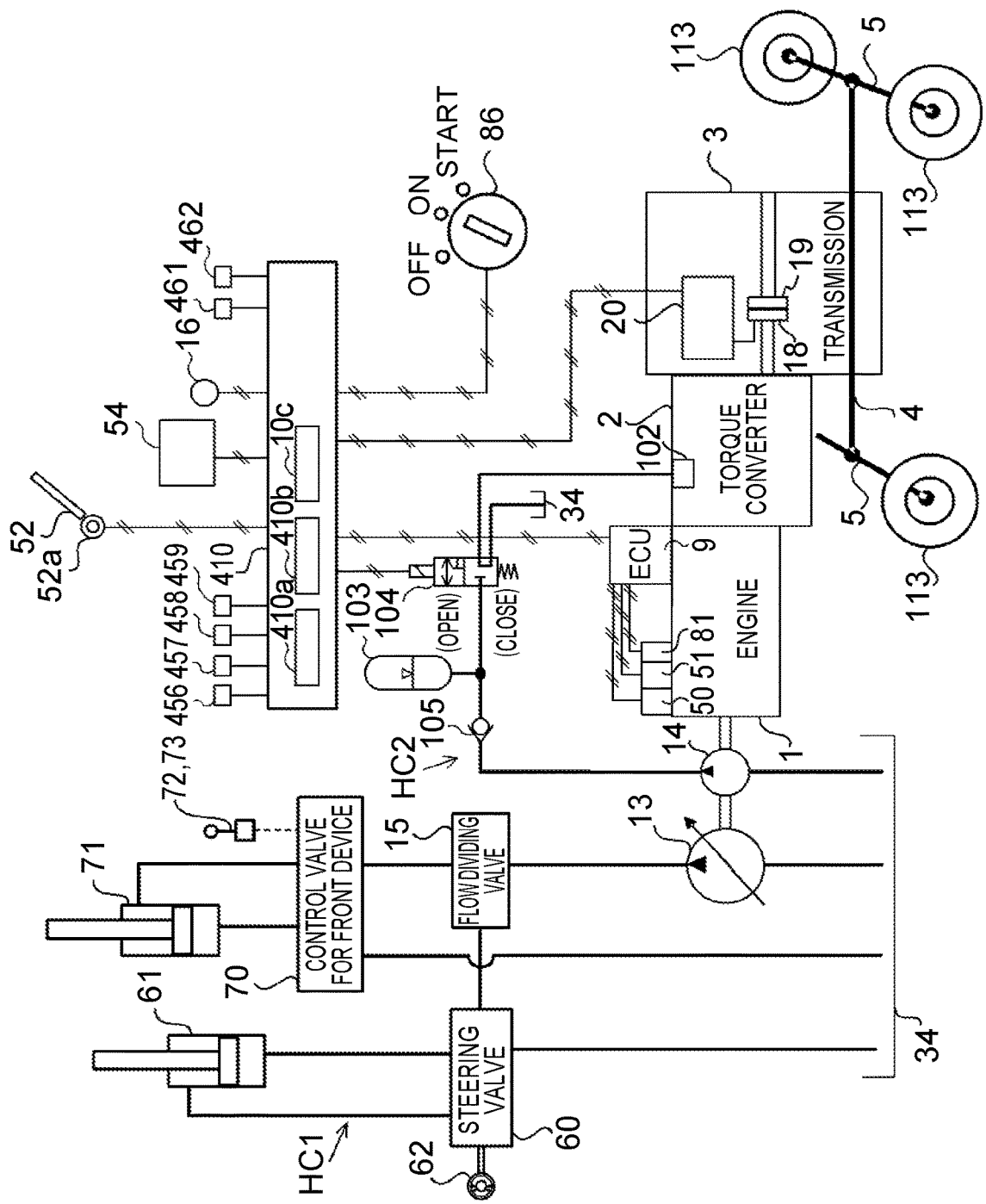
FIG. 8 is a diagram for explaining a wheel loader according to a fourth embodiment of the present invention.
Figure 9:
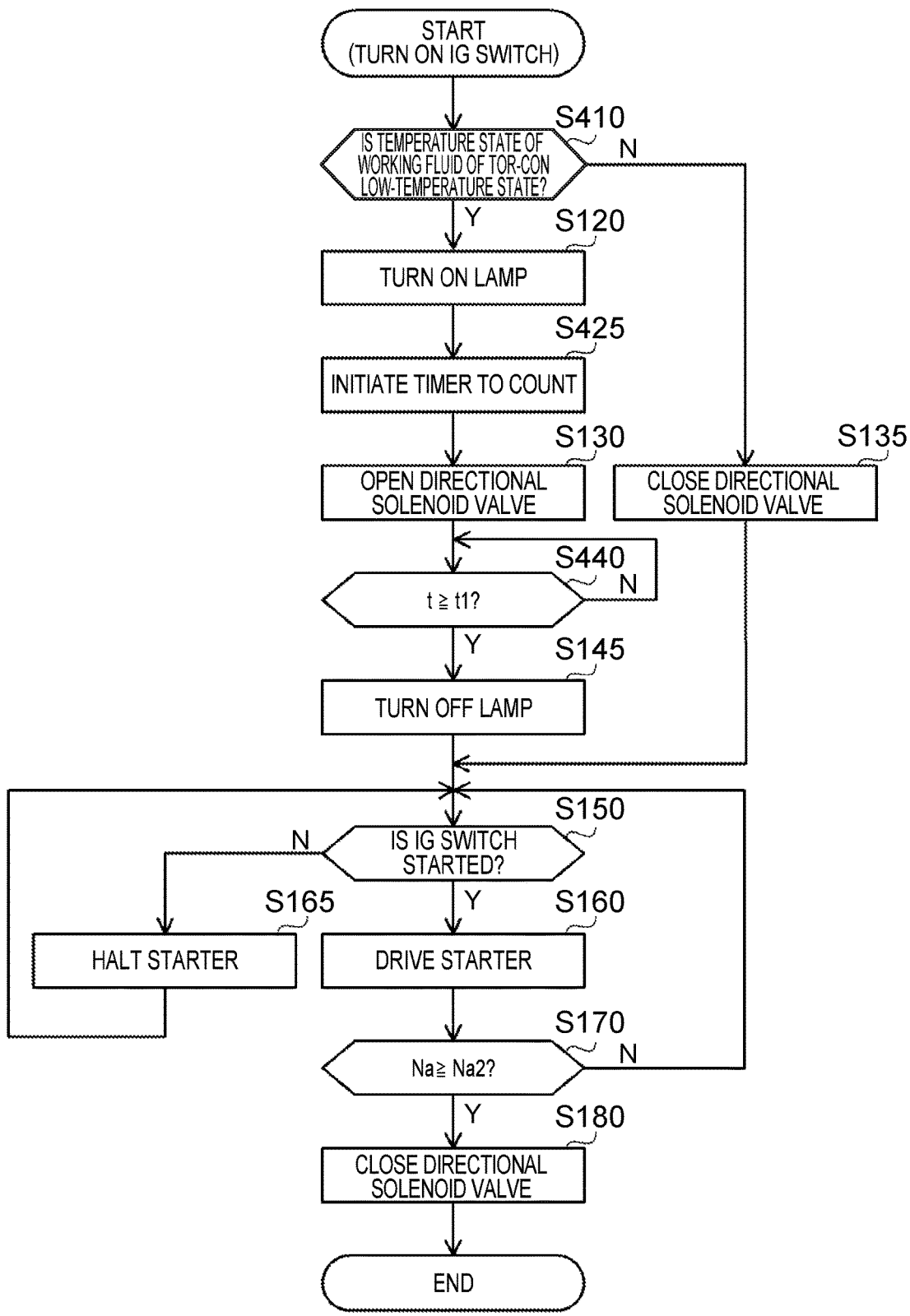
FIG. 9 is a flowchart showing one example of engine start processing performed by a controller according to the fourth embodiment of the present invention.

With reference to FIG. 8 and FIG. 9, a work vehicle according to a fourth embodiment of the present invention is explained. Incidentally, the same reference sign is given to the same or corresponding portion as that of the first embodiment in FIG. 8 and FIG. 9, and different points are mainly explained. FIG. 8 is a view for explaining a wheel loader according to the fourth embodiment of the present invention. In the fourth embodiment, the low-temperature state is determined except by the air heater 82.

As shown in FIG. 8, an outside air temperature sensor 456 is connected to a controller 410. The outside air temperature sensor 456 detects the temperature Ta of open air, and outputs a detection signal to the controller 410. The controller 410 has a low-temperature state determination unit 410*a* as its function in place of the low-temperature state determination unit 10*a* of the first embodiment. When the following temperature condition 1 is fulfilled, the low-temperature state determination unit 410*a* determines that the temperature state of the working fluid of the tor-con 2 is the low-temperature state. When the following temperature condition 1 is not fulfilled, the low-temperature state determination unit 410*a* determines that the temperature state of the working fluid of the tor-con 2 is not the low-temperature state. (Temperature condition 1) The outside air temperature Ta detected by the outside air temperature sensor 456 is less than or equal to a threshold Ta1.

The threshold Ta1 is previously decided by an experiment etc. in consideration of the engine load at the time of the engine starting, and is stored in a storage device of the controller 410. When the outside air temperature Ta is lower than the threshold Ta1, the engine load at the time of the engine starting with the lock-up clutch 102 switched to the engagement state tends to be smaller than the engine load at the time of the engine starting with the lock-up clutch 102 switched to the non-engagement state. In contrast, when the outside air temperature Ta is higher than the threshold Ta1, the engine load at the time of the engine starting with the lock-up clutch 102 switched to the engagement state tends to be larger than the engine load at the time of the engine starting with the lock-up clutch 102 switched to the non-engagement state.

The controller 410 has the notification control unit 410*b* as its function in place of the notification control unit 10*b* of the first embodiment. When it is determined by the low-temperature state determination unit that the temperature state of the working fluid is the low-temperature state, the notification control unit 410*b* outputs the lighting signal for turning ON the lamp 16 turn to the lamp 16.

A timer is built in the controller 410 and the timer is controlled by the controller 410. The notification control unit 410*b* initiates measurement of time (timer count) with the timer from a time when it is determined by the low-temperature state determination unit 410*a* that the temperature state of the working fluid is the low-temperature state. The notification control unit 410*b* determines whether a measurement time t by the timer becomes more than or equal to a setting time t1 stored in the storage device in advance. When the measurement time t becomes more than or equal to the setting time t1, the notification control unit 410*b* outputs the light-off signal for turning OFF the lamp 16 to the lamp 16. That is, the notification control unit 410*b* keeps the lamp 16 light ON after being determined to be the low-temperature state until the setting time t1 elapses.

The setting time t1 is a time (for example, 2 or 3 seconds) longer than the transition time after the lock-up clutch 102 is in the non-engagement state until it becomes the perfect engagement state after the power supply unit 54 was activated, and is stored in advance in the storage device.

FIG. 9 is a flowchart showing one example of engine start processing performed by the controller 410 according to the fourth embodiment of the present invention. The flowchart of FIG. 9 is the flowchart of FIG. 4 to which processing of step S425 is added between steps S120 and S130 of the flowchart of FIG. 4 and to which processing of steps S410 and S440 is added in place of the steps S110 and S140 of the flowchart of FIG. 4.

In step S410, the controller 410 determines whether the temperature state of the working fluid of the tor-con 2 is the low-temperature state. When the affirmative determination is made in step S410, the process progresses to step S120; when the negative determination is made in step S410, the process progresses to step S135.

In step S120, when the controller 410 performs lamp lighting processing, it progresses the process to step S425, where the controller 410 initiates count of the timer and progresses the process to step S130.

In step S130, when the controller 410 performs directional solenoid valve open operation processing, the process progresses to step S440, where the controller 410 determines whether the measurement time t by the timer is more than or equal to a predetermined setting time t1 (t>=t1) that was decided in advance. The controller 410 performs processing of step S440 repeatedly until the affirmative determination is made, and when the affirmative determination is made, the process progresses to step S145.

According to the fourth embodiment like this, it is possible to obtain the same effects as (1) to (4) explained in the first embodiment.

First Modification of Fourth Embodiment

As shown in FIG. 8, the cooling-water temperature sensor 457 is connected to the controller 410. The cooling-water temperature sensor 457 detects a temperature Tw of the cooling water of the engine 1, and outputs a detection signal to the controller 410. When the following temperature condition 2 is fulfilled in place of the temperature condition 1 of the fourth embodiment, the low-temperature state determination unit 410*a* determines that the temperature state of the working fluid of the tor-con 2 is the low-temperature state. When the following temperature condition 2 is not fulfilled, the low-temperature state determination unit 410*a* determines that the temperature state of the working fluid of the tor-con 2 is not the low-temperature state. Incidentally, a threshold Tw1 is previously decided by an experiment etc. from the same viewpoint as that of the threshold Ta1 described above. (Temperature condition 2) The cooling water temperature Tw detected by the cooling-water temperature sensor 457 is less than or equal to the threshold Tw1.

Second Modification of Fourth Embodiment

As shown in FIG. 8, a hydraulic oil temperature sensor 458 is connected to the controller 410. The hydraulic oil temperature sensor 458 detects a temperature To of the hydraulic oil discharged from the main pump 13 that drives the front working device 119, and outputs a detection signal to the controller 410. When the following temperature condition 3 is fulfilled in place of the temperature condition 1 of the fourth embodiment, the low-temperature state determination unit 410*a* determines that the temperature state of the working fluid of the tor-con 2 is the low-temperature state. When the following temperature condition 3 is not fulfilled, the low-temperature state determination unit 410*a* determines that the temperature state of the working fluid of the tor-con 2 is not the low-temperature state. Incidentally, a threshold To1 is previously decided by an experiment etc. from the same viewpoint as that of the threshold Ta1 described above. (Temperature condition 3) The temperature To of the hydraulic oil detected by the hydraulic oil temperature sensor 458 is less than or equal to the threshold To1.

Third Modification of Fourth Embodiment

As shown in FIG. 8, a tor-con oil temperature sensor 459 is connected to the controller 410. The tor-con oil temperature sensor 459 detects a temperature Tt of the working fluid (tor-con oil) of the tor-con 2, and outputs a detection signal to the controller 410. When the following temperature condition 4 is fulfilled in place of the temperature condition 1 of the fourth embodiment, the low-temperature state determination unit 410*a* determines that the temperature state of the working fluid of the tor-con 2 is the low-temperature state. When the following temperature condition 4 is not fulfilled, the low-temperature state determination unit 410*a* determines that the temperature state of the working fluid of the tor-con 2 is not the low-temperature state. Incidentally, a threshold Tt1 is previously determined by an experiment etc. from the same viewpoint as that of the threshold Ta1 described above. (Temperature condition 4) The temperature Tt of the working fluid of the tor-con 2 detected by the tor-con oil temperature sensor 459 is less than or equal to the threshold Tt1. Incidentally, a modification may adopt the following configuration: a transmission oil temperature sensor for detecting the transmission oil temperature is provided, and the transmission oil temperature is used instead of the working fluid temperature of the tor-con 2 described above. That is, "the transmission oil temperature detected by the transmission oil temperature sensor is less than or equal to the threshold" may be used as (Temperature condition 4).

Fourth Modification of Fourth Embodiment

As shown in FIG. 8, an intake-air temperature sensor 461 is connected to the controller 410. The intake-air temperature sensor 461 detects an intake-air temperature Ti of the engine 1, and outputs a detection signal to the controller 410. When the following temperature condition 5 is fulfilled in place of the temperature condition 1 of the fourth embodiment, the low-temperature state determination unit 410*a* determines that the temperature state of the working fluid of the tor-con 2 is the low-temperature state. When the following temperature condition 5 is not fulfilled, the low-temperature state determination unit 410*a* determines that the temperature state of the working fluid of the tor-con 2 is not the low-temperature state. Incidentally, a threshold Ti1 is previously determined from the same viewpoint as that of the threshold Ta1 described above by an experiment etc. (Temperature condition 5) The engine intake-air temperature Ti detected by the intake-air temperature sensor 461 is less than or equal to the threshold Ti1.

Fifth Modification of Fourth Embodiment

Although in the fourth embodiment and the first to fourth modifications of the fourth embodiment, the examples where the low-temperature state determination unit 410*a* determined that the temperature state of the working fluid of the tor-con 2 was the low-temperature state when the single temperature condition was fulfilled were explained, the present invention is not limited to this. When at least any one of the outside air temperature Ta, the intake-air temperature Ti, the cooling water temperature Tw, the hydraulic oil temperature To, the transmission oil temperature, the working fluid temperature Tt of the tor-con 2 is less than or equal to a predetermined temperature, a low-temperature state determination unit 410*a* can determine that the temperature state of the working fluid of the tor-con 2 is the low-temperature state. Alternatively, the low-temperature state determination unit 410*a* may determine that the temperature state of the working fluid of the tor-con 2 is the low-temperature state when, for example, two or more conditions among (temperature condition 1) to (temperature condition 5) are filled.

Sixth Modification of Fourth Embodiment

As shown in FIG. 8, a starter current sensor 462 is connected to the controller 410. The starter current sensor 462 detects a current supplied to the sel-motor of the starter 81, and outputs a detection signal to the controller 410. When the following criterion 1 is fulfilled in place of the temperature condition 1 of the fourth embodiment, the low-temperature state determination unit 410*a* may determine that the temperature state of the working fluid of the tor-con 2 is the low-temperature state. When the following criterion 1 is not fulfilled, the low-temperature state determination unit 410*a* determines that the temperature state of the working fluid of the tor-con 2 is not the low-temperature state.

(Criterion 1) The starter current i detected by the starter current sensor 462 is more than or equal to a threshold i1.

When the temperature state of the tor-con 2 is the low-temperature state, and at the same time, the clutch part 102*c* of the lock-up clutch 102 is in the non-engagement state, if the engine 1 is driven by the starter 81, the starter current (consumption current) i will become large because the load to the sel-motor of the starter 81 will become large. For this reason, when it is detected that the starter current i is more than or equal to a threshold value i1 that was decided in advance, the low-temperature state determination unit 410*a* determines that the temperature state of the working fluid of the tor-con 2 is the low-temperature state.

In this modification, when the ignition switch 86 is manipulated to the START position for the first time after the operator boarded in the cab 121, there is a case where the engine 1 cannot be started resulting from the working fluid temperature of the tor-con 2 being low and its viscosity being high. However, a result (flag) that it was determined by the low-temperature state determination unit 410*a* that the temperature state of the working fluid of the tor-con 2 was the low-temperature state is stored in the storage device of the controller 410. For this reason, when the operator manipulates the ignition switch 86 to the START position at the second time, the engine 1 will be driven to rotate by the starter 81 after the clutch part 102*c* of the lock-up clutch 102 becomes the engagement state, and therefore the startability of the engine 1 is improved.

Seventh Modification of Fourth Embodiment

When the following criterion 2 is fulfilled in place of the temperature condition 1 of the fourth embodiment, the low-temperature state determination unit 410*a* may determine that the temperature state of the working fluid of the tor-con 2 is the low-temperature state. When the following criterion 2 is not fulfilled, the low-temperature state determination unit 410a determines that the temperature state of the working fluid of the tor-con 2 is not the low-temperature state.

(Criterion 2) A time rate of change (acceleration) α of the actual rotational speed Na of the engine 1 is less than or equal to a threshold α1.

The controller 410 acquires information of the actual rotational speed Na of the engine 1 detected by the engine rotation speed sensor 50 through the engine controller 9. The controller 410 calculates the time rate of change (acceleration) α of the actual rotational speed Na of the engine 1 based on the actual rotational speed Na of the engine 1 acquired for every control period and a time corresponding to the control period, and stores it in the storage device in advance. Incidentally, the time rate of change a may be calculated as an average value of a few control periods to a few tens of control periods.

In a cold district etc., when the ignition switch 86 is manipulated to the START position for the first time after the operator boarded in the cab 121, there may be a case where build up of the engine 1 becomes slow resulting from the working fluid temperature of the tor-con 2 being low and its viscosity being high. In this modification, when rising of the engine 1 is slow (α<=α1), it is determined by the low-temperature state determination unit 410a that the temperature state of the working fluid of the tor-con 2 is the low-temperature state, and its result (flag) is stored in the storage device. For this reason, when the operator manipulates the ignition switch 86 to the START position on the next day etc., the engine 1 will be driven to rotate by the starter 81 after the clutch part 102c of the lock-up clutch 102 becomes the engagement state, and the startability of the engine 1 will be improved.

The following modifications are also within a range of the present invention, and it is also possible to combine one or multiple of modifications with the above-mentioned embodiment.

First Modification

In the first embodiment, although the example where the air heater 82 was operated automatically was explained, the present invention is not limited to this. An operating switch for manually operating the air heater 82 may be provided, and the air heater 82 may be configured not to operate automatically. Here, it is likely that a case where the operator operates the air heater 82 is a case where the surrounding environment is a low temperature environment and the temperature state of the working fluid of the tor-con 2 is also the low-temperature state. For this reason, whether the temperature state of the working fluid of the tor-con 2 is the low-temperature state can be determined based on the manipulation position of the operating switch of the air heater 82.

When the operating switch is manipulated to the manipulation position at which the air heater 82 is operated, the low-temperature state determination unit 10a according to this modification determines that the temperature state of the working fluid of the tor-con 2 is the low-temperature state. When the operating switch is manipulated to the manipulation position at which the air heater 82 is not operated, the low-temperature state determination unit 10a determines that the temperature state of the working fluid of the tor-con 2 is not the low-temperature state. According to the modification like this, it is possible to obtain the same effects as those of the first embodiment.

Incidentally, whether the temperature state of the working fluid of the tor-con 2 is the low-temperature state may be determined based on the manipulation position of the operating switch that makes a choke valve (unillustrated) operate in place of the operating switch of the air heater 82.

Second Modification

Although in the embodiments described above, the examples where the flow of the hydraulic oil discharged from the hydraulic source was controlled by the directional solenoid valve 104 were explained, the present invention is not limited to this. For example, a proportional solenoid valve may be adopted in place of the directional solenoid valve 104.

Third Modification

Although in the embodiments described above, the lamp 16 is taken as the example and is explained as the notification device for notifying prohibition of the starting of the engine 1, the present invention is not limited to this. For example, a display image that prohibits the starting of the engine 1 may be displayed on a display device such as a liquid crystal monitor, and a beep sound that prohibits the starting of the engine 1 may be outputted by a sound output device such as a loudspeaker.

Fourth Modification

The engine controller 9 may be configured to have functions that the controllers 10, 210, 310, and 410 have, or the controllers 10, 210, 310, and 410 may be configured to have a function that the engine controller 9 has. The functions may be distributed to three or more controllers, and the functions may be aggregated to one controller.

Fifth Modification

Although in the embodiment described above, the work vehicle having the bucket 112 as the work tool was explained as one example, the present invention is not limited to this. For example, the present invention may be applied to a work vehicle having work tools, such as a plough and a sweeper.

Sixth Modification

Although in the embodiments described above, the examples of the wheel loader were explained as one example of the work vehicle, the present invention is not limited to this, and the work vehicle may be another traveling work vehicle having the torque converter 2, such as a wheel shovel, a telescopic handler, and a lift truck.

Although in the above, various embodiments and modifications were explained, the present invention is not limited to these contents. Other modes that are considerable within a range of technical idea of the present invention are also included within the range of the present invention.

What is claimed is:
1. A work vehicle that includes:
a working device having a work tool and a lift arm;
wheels;
an engine as a driving source;
a torque converter for transmitting power of the engine to the wheels through working fluid;
a lock-up clutch capable of switching an input member and an output member of the torque converter between an engagement state and a non-engagement state;
a power supply unit for supplying electric power to a control device; and
an indicating device for directing activation of the power supply unit and starting of the engine,
comprising: a hydraulic source;
a control valve that controls a flow of hydraulic oil discharged from the hydraulic source, and switches the lock-up clutch to either state of the engagement state or the non-engagement state; and an engine starting device for starting the engine when the starting of the engine is directed by the indicating device, wherein the control device has:

a low-temperature state determination unit that when the activation of the power supply unit is directed by the indicating device and the power supply unit is activated, determines whether a temperature state of the working fluid of the torque converter is a low-temperature state; and a clutch control unit that when it is determined by the low-temperature state determination unit that the temperature state of the working fluid is not the low-temperature state, controls the control valve in order to switch the lock-up clutch to the non-engagement state, and that when it is determined by the low-temperature state determination unit that the temperature state of the working fluid is the low-temperature state, controls the control valve in order to switch the lock-up clutch to the engagement state.

2. The work vehicle according to claim 1, wherein when the engine is started by the engine starting device with the lock-up clutch in the engagement state, and at the same time, the rotational speed of the engine becomes more than or equal to a predetermined rotational speed, the clutch control unit switches the lock-up clutch to the non-engagement state by controlling the control valve.

3. The work vehicle according to claim 1, wherein the control device has a notification control unit that notifies with a notification device that the starting of the engine is prohibited for a predetermined time after the power supply unit is activated, and the predetermined time is longer than a transition time between the non-engagement state and engagement state in the lock-up clutch.

4. The work vehicle according to claim 1, wherein the hydraulic source is an accumulator or electric pump driven independently from driving of the engine, and the clutch control unit switches the lock-up clutch to the engagement state or the non-engagement state based on a determination result by the low-temperature state determination unit before the power supply unit is activated, and at the same time, the starting of the engine is directed by the indicating device.

5. The work vehicle according to claim 1, wherein the hydraulic source is a hydraulic pump that discharges the hydraulic oil by driving of the engine, and is configured so that the hydraulic oil discharged from the hydraulic pump is supplied to the lock-up clutch through the control valve, and the lock-up clutch is switched to either of the engagement state or the non-engagement state by the hydraulic oil discharged from the hydraulic pump by the indicating device directing the starting of the engine and by the engine starting device driving the engine.

6. The work vehicle according to claim 1, wherein the lock-up clutch is a negative type lock-up clutch that is switched to the engagement state by elastic power of a spring and is switched to the non-engagement state by the hydraulic oil discharged from the hydraulic source.

7. The work vehicle according to claim 1, comprising an air heater, wherein the low-temperature state determination unit determines whether the air heater is operating, and when it is determined that the air heater is operating, determines that the temperature state of the working fluid of the torque converter is the low-temperature state.

8. The work vehicle according to claim 1, wherein when at least anyone of an outside air temperature, an intake-air temperature, a cooling water temperature of the engine, a temperature of the hydraulic oil discharged from the hydraulic pump for driving the work device, a transmission oil temperature, and a working fluid temperature of the torque converter is less than or equal to a predetermined temperature, the low-temperature state determination unit determines that the temperature state of the working fluid of the torque converter is the low-temperature state.

* * * * *